June 28, 1932.  W. T. RIDDLE  1,864,943
GLARE SHIELD MOUNTING
Filed May 26, 1930
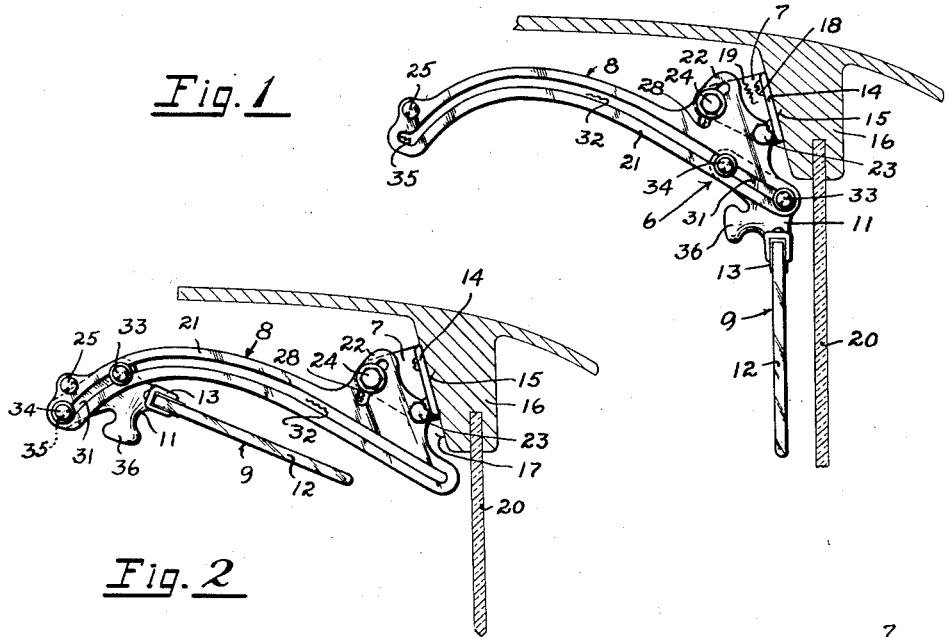
Fig.1
Fig.2
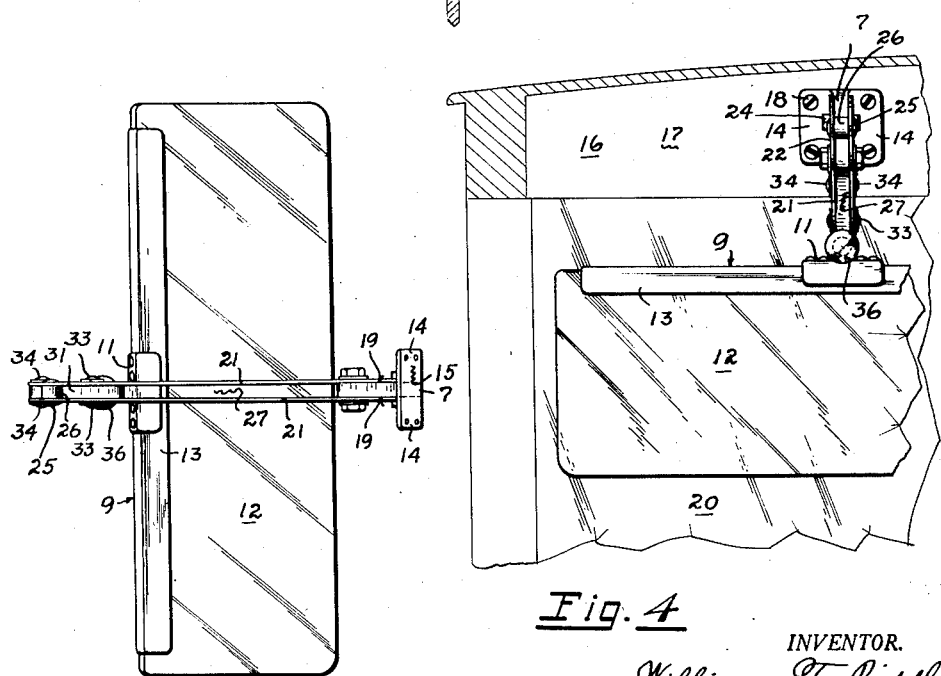
Fig.3
Fig.4
INVENTOR.
William T. Riddle
BY M. C. Frank
ATTORNEY.

Patented June 28, 1932

1,864,943

UNITED STATES PATENT OFFICE

WILLIAM T. RIDDLE, OF NEVADA CITY, CALIFORNIA

GLARE SHIELD MOUNTING

Application filed May 26, 1930. Serial No. 455,568.

The invention relates to a glare shield for the use of a driver of a motor vehicle, and more particularly to a mounting means for such a shield.

An object of the invention is to provide a generally improved and simplified glare shield mounting for permitting a disposal of the shield in either operative or inoperative position.

Another object is to provide a mounting of the class described which provides for supporting the glare shield on differently disposed elements of different vehicles.

A further object is to provide for an entirely gravity retention of the glare shield in both its operative and inoperative positions whereby to avoid a use of and dependence on clamp screws or the like.

Yet another object is to provide a glare shield mounting which occupies a minimum of space in a vehicle.

The invention possesses other objects and features of advantage, some of which, with the foregoing, will be set forth or be apparent in the following description of a preferred form of the invention which is illustrated in the accompanying drawing, in which:

Figure 1 is a side elevation of a glare shield mounting embodying the invention and mounted on a top frame member defining in part a windshield opening of a vehicle, a shield carried by the mounting being operatively disposed adjacent the windshield.

Figure 2 is a view similar to Figure 1 except that the shield is shown disposed in inoperative position.

Figure 3 is a plan view of the mounting and shield as shown in Figure 2.

Figure 4 is an inside elevation of the mounting and shield, the shield being disposed as in Figure 1.

Referring to said drawing, the present invention is seen to essentially comprise a bracket structure 6 including a base block 7 for securing to a fixed object and a bracket arm 8 extending generally horizontally from said base block, and means to adjustably support a glare-shield 9 on the arm. The shield-carrying means comprising a member 11 to which the shield is fixed and which member engages the arm for longitudinal adjustment therealong whereby to optionally support the shield in depending and operative position or in a generally horizontal and inoperative position, said positions of the glare shield being respectively brought out in Figures 1 and 2.

The shield 9 may be constituted as desired; as particularly disclosed, the shield comprises a pane 12 of glass, or some other relatively rigid material, having a binding and reinforcing member 13 suitably fixed along the top edge thereof, the latter member being in turn fixed to the member 11. For insuring a minimum of strains in the shield pane, the point of attachment of the members 11 and 13 may well be midway of the length of the pane, as is particularly disclosed. The exact nature of the glare shield element is generally immaterial to the present invention except that said shield must be rigid against deformations thereof.

The base block 7 is provided with lateral flanges 14 cooperative to provide a support-engaging face 15. As particularly shown, said block is mounted on the upper member 16 of the frame of a windshield opening of a motor vehicle or the like with the base face 15 engaging an inner face 17 of said frame member, screws or bolts 18 extending through the flanges 14 for securing the block to the frame member. For a reason which will be hereafter evident, opposite side faces 19 of the block are mutually parallel.

The bracket arm 8, it will now be noted, comprises a pair of like members 21 having upper portions 22 thereof similarly engaged against the base block faces 19 whereby said members are arranged to extend generally horizontally from the block in mutually opposed and parallel relation. Bolts 23 and 24 are engaged through the members 21 and block 7 for securing the members to the block. The portions 22 of the members 21 are near that end of the arm which lies nearest the windshield, and the other ends of said members are secured in relatively fixed relation by means of a bolt or rivet 25 engaged through the members and a spacer sleeve 26 interposed between the members. In this manner, the arm 8 is arranged to maintain its form and a guideway 27 of uniform horizontal width is defined between the members 21, said guideway, in the present instance, extending below the base block 7 and the spacer sleeve 26.

Preferably, and as shown, the perforations of the members 21 designed to receive the bolt 24 comprise arcuate slots 28 having their center of curvature the axis of the bolt 23 whereby to permit a certain range of angular adjustment of the arm 8 with respect to the block face 15. This means of mounting the arms provides for the mounted installation of the present device on vehicle surfaces defining different angles with the plane of the windshield pane 20 whereby the arm may be disposed to define the same angle with the windshield in different installations of the mounting, it being noted that when the glare shield is in operative position, it has a fixed angular relation to the arm by reason of its hereinafter described mounting thereon.

An upper portion 31 of the shield-carrying member 11, it will now be noted, is slidably engaged in the guideway 27 provided in the described arm structure for movement in a curved path. For constraining the member 11 to movement in said path, the arm members 21 are provided with mutually opposed and appropriately curved longitudinal slots 32 in which headed pins 33 and 34 fixed to and extending transversely from the guideway-engaging sides of the portion 31 of the member 11 are arranged to engage. The pins 33 are axially aligned, as are the pins 34, and the plane defined by the pin axes makes an angle of approximately forty-five degrees with the plane of the glare shield pane 12. With the arm 8 extended in an operative position, the slots 28 are seen to curve convexedly upwardly from both ends thereof to a common intermediate point of the slots whereby the different slot portions slope oppositely with respect to said point. The slots 32 are seen to form, in effect, operative parts of the guideway 27.

The actual shape of the slots 32 is such that when the member 11 is nearest the windshield and the pins 33 engage the extreme forward slot ends, the pane 12 will be more or less parallel to the windshield pane 20; as shown, the pane 12 is parallel to the pane 20. When the member 11 is furthest from the windshield and the pins 34 engage the extreme rearward slot ends, the pane 12 is arranged to lie in raised position and in generally parallel relation to the arm 8 whereby it is completely removed from the field of vision of a driver looking through the windshield portion which is arranged to be shielded when the pane is in its operative position. Since both the slopes of windshield frame surfaces on which to mount the bracket base and of the windshield panes themselves may vary, the utility of a provision for angularly adjusting the arm 8 will now be clear.

Upward extensions 35 of the slots 32 are provided at the rearward slot ends for the reception of the pins 34 whereby to normally secure the member 11 against forward movement in the slot when the pins 34 engage the slot portion 35. To release the member 11, it is merely necessary to rock the same against the influence of gravity until the pins 34 clear the slot portions 35, and then move the member 11 forwardly. When the member 11 is in its forward position, it tends to stay there entirely through the influence of gravity. To facilitate a moving of the glare shield between its aforesaid operative and inoperative positions, a knob 36 may be provided on the inner side of the member 11, as is particularly shown.

The arm members 21, it is noted, may comprise flat stampings of sheet metal, and the base block 7 and member 11 may be cast, whereby an inexpensive structure results. Except at the bolts 23, 24, and 25, the outlines of the arm members 21 may follow the curved slots 32 whereby a minimum of material is used and a pleasing design results. Should it be desired to secure the present mounting at a windshield frame point having a windshield wiper mechanism, or other device thereat, it is obvious that the base block 7 might well be designed to span such device and that a base block so formed would lie within the scope of the present invention. It is noted further that even if the swivelled mounting of the arm 8 is omitted, the base block is desirable as a spacer for the members 21.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative, and that such changes may be made, when desired, as fall within the scope of the appended claim.

Having thus described my invention, I claim as new and desire to secure by Letters Patent of the United States the following:

In a support for a glare shield for operative disposal adjacent and in generally parallel relation to a windshield having a frame, a shield-supporting element fixed to the glare shield, a bracket arm providing an arcuate guideway for said element whereby said element is arranged to respectively dispose said shield in said operative position and in an inoperative position when the element is in different extreme positions in the guideway, a base block for mounting on said frame and pivotally carrying said arm whereby to permit an adjustment of the angular relation of the glare shield and windshield when the glare shield is in said operative position thereof, and means to secure said arm in fixed adjusted relation to said block.

In testimony whereof, I affix my signature.

WILLIAM T. RIDDLE.